March 3, 1942.   L. I. YEOMANS   2,274,764
THRUST BEARING
Filed Oct. 11, 1939   2 Sheets-Sheet 1
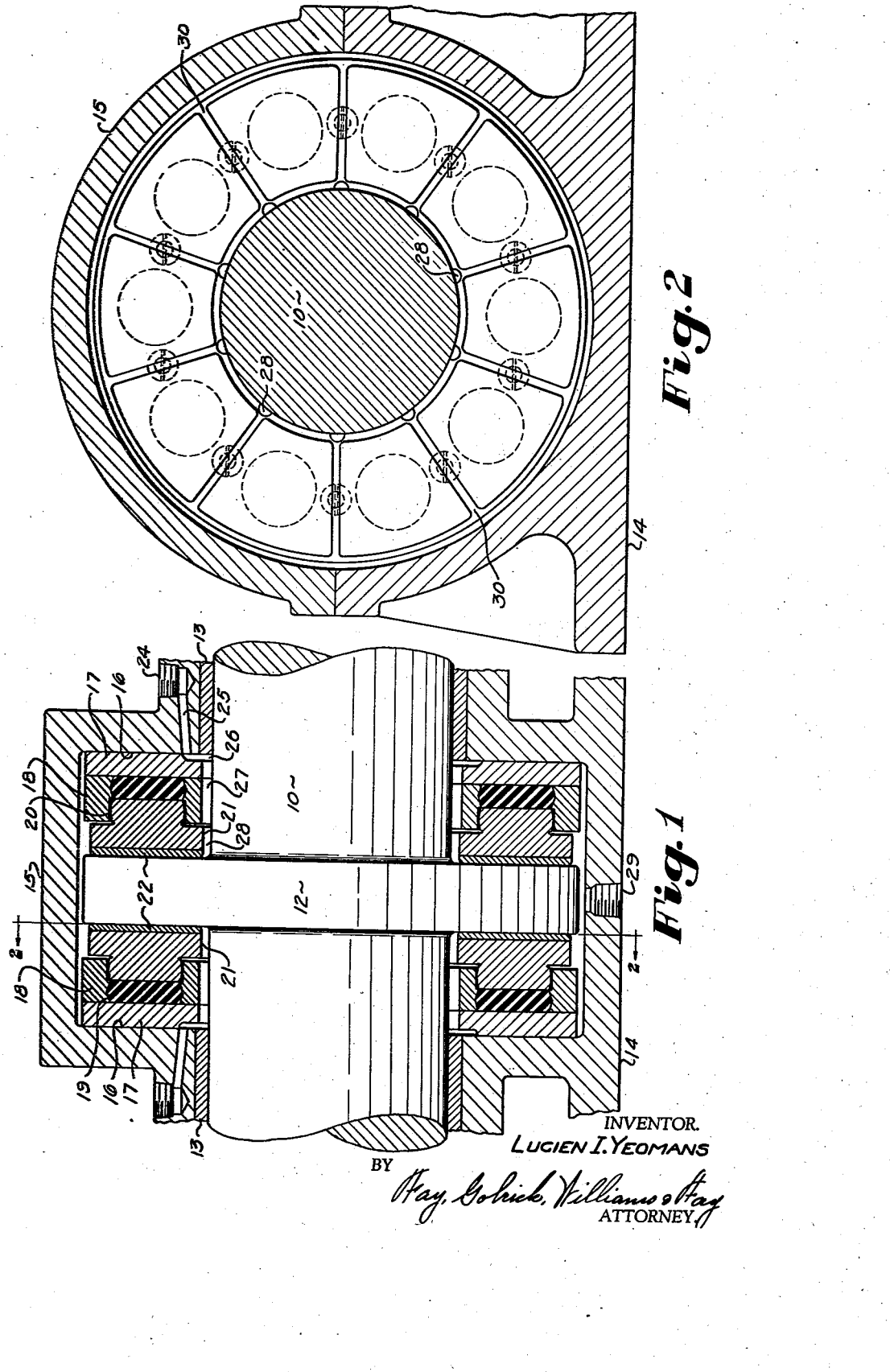
INVENTOR.
LUCIEN I. YEOMANS
BY
ATTORNEY March 3, 1942.  L. I. YEOMANS  2,274,764
THRUST BEARING
Filed Oct. 11, 1939  2 Sheets-Sheet 2
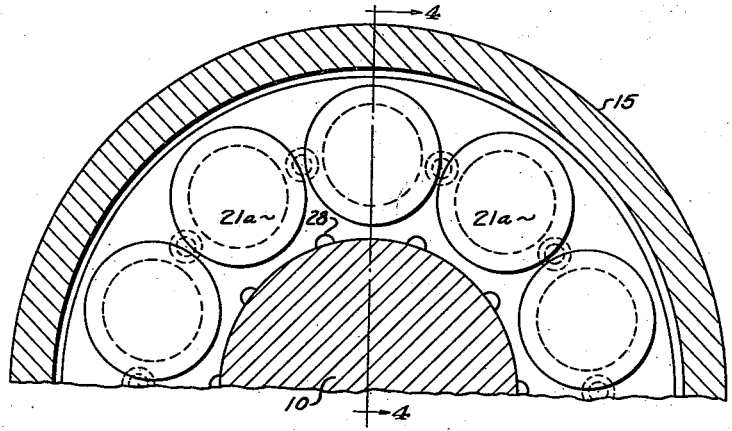
Fig. 3
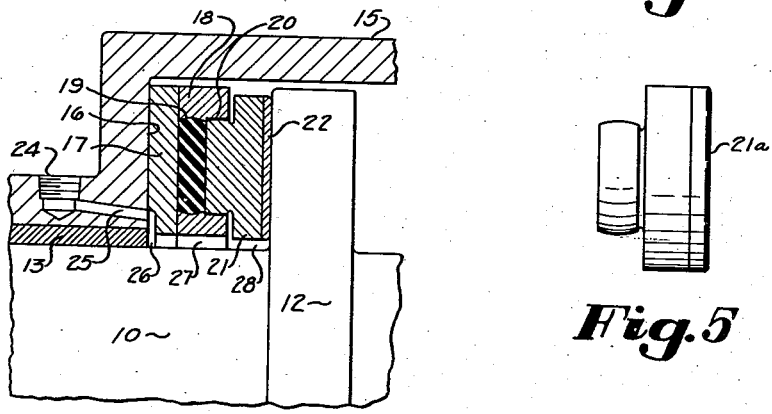
Fig. 4
Fig. 5
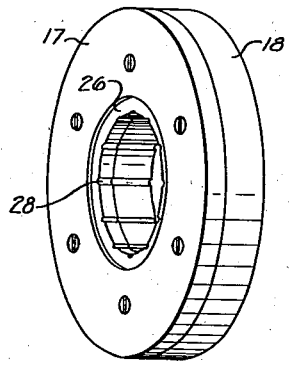
Fig. 6
INVENTOR.
LUCIEN I. YEOMANS
BY
ATTORNEY.

Patented Mar. 3, 1942

2,274,764

UNITED STATES PATENT OFFICE 2,274,764

THRUST BEARING

Lucien I. Yeomans, Chicago, Ill., assignor to E. W. Bliss Company, Brooklyn, N. Y., a corporation of Delaware Application October 11, 1939, Serial No. 298,915

3 Claims. (Cl. 308—160)

This invention relates to heavy bearings of the flat surface type, such as are adapted for use to limit the end movement of shafting, as in ordinary thrust bearings, or for step bearings adapted to support rotating parts of considerable weight, as in turbines and the like.

It is known that two perfectly flat and parallel surfaces will support little load upon a true oil film. In order to support an appreciable load the oil or other lubricant must be drawn into a wedge-shaped space between the surfaces in order to produce, during rotation, the fluid pressure necessary to maintain the film and hold the surfaces apart. The angle at which such surfaces are positioned relatively to each other should vary with the speed, the load pressure, the type of lubricant employed and other incidental factors in the operation of the bearings. Such a thrust bearing essentially is composed of a series of independent bearing surfaces each adapted to lie in such relation with a coacting surface as to create and maintain the wedge-shaped lubricant film which is essential to the support of the load.

My invention is directed particularly to the provision of relatively large supports which are adapted to carry the imposed loads and preserve the general position of the segmental bearing surfaces without deflection. At the same time these surfaces are so supported that they will readily yield in such a manner as to permit the automatic positioning of the surfaces with respect to the coacting face such as to automatically meet the various conditions under which the bearing is employed.

The general object of the invention therefore has been to provide an improved thrust bearing construction which will afford more efficient lubrication between the sliding surfaces and hence permit the handling of greater loads. A further object of the invention has been to mount the sliding surfaces with respect to each other such that variations in factors affecting the lubrication, such as load, speed and the like may be automatically compensated for. Still another object has been to employ a simplified construction in the attaining of the foregoing ends, which construction will be readily accessible.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various structural forms in which the principle of the invention may be used.

In said annexed drawings:

Fig. 1 is a vertical, longitudinal, sectional view of a radial and double thrust bearing construction embodying my invention;

Fig. 2 is a transverse section through Fig. 1, as indicated by the lines 2—2 thereon;

Fig. 3 is a fragmentary section similar to Fig. 2 showing a modified form of the segmental bearing plates;

Fig. 4 is a section through Fig. 3, as indicated by the lines 4—4 thereon;

Fig. 5 is a side elevation of a segmental bearing plate as employed in Fig. 4.

Fig. 6 is a perspective view of the retainer plate construction as shown in Fig. 1.

Referring now to Fig. 1, there is shown a shaft 10 having an integral flange 12, the shaft being mounted for rotation in radial bearings 13. These bearings are of the pedestal split housing type embodying a base 14 and a cap 15. While the invention, as above indicated, employs a thrust bearing intermediate of the ends of the shaft, it will be apparent that the construction may be modified to incorporate a thrust bearing at one or both ends of the shaft if desired.

The housing is provided with a pair of radial faces 16 adjacent each end thereof which support annular backing plates 17. These plates in turn carry a retaining ring 18, preferably of bronze or other non-corrosive material.

The bearing segments are supported in a series of anchor pockets formed in the aforementioned ring. To this end each pocket side wall is V-shaped, as indicated at 19 to receive a resilient displaceable pad and retain the same therein. The pockets are bored, as at 20, to respectively support in spaced relation a series of segmental bearing plates 21 provided with necks adapted to be received within the aforementioned pockets and to bear against the segmental bearing supports or pads. Preferably, the segments co-operate with each other to form a generally continuous bearing ring for engagement with each shaft flange.

The bearing pads are made of material such as polymerized chloroprene, or the so-called synthetic rubbers which have been so combined and cured as to be most resistant to the effects of lubricants. These materials are essentially incompressible, although readily displaceable, and they provide supports which yield slightly to allow the material to adapt itself to slight changes in the angular position of the plates 21.

The wear receiving faces of the plates are faced with a bearing material 22 which forms with the thrust flange 12 the desired thrust bearing. The portions of each of the bearing plates extending within the anchor pockets are machined so that their annular peripheries are spherical which, in a direction perpendicular to the anchor axes, have the same diameter as the cylindrical anchor pockets in the rings 18; thus allowing these parts to tilt relatively to each other.

Lubricant is supplied to the housing in sufficient quantity to provide films between the flange face 12 and the corresponding sections of bearing material 22. This lubricant is conveniently supplied through a tapped socket 24 and then through passages 25, 26, 27 and 28 to the face of the bearing metal 22 on the segmental plates 21. Surplus lubricant, after passing through the bearings, may be removed through the tapped socket 29.

The segmental bearing plates are slightly tiltable in their pockets, as hereafter set out and are spaced from each other as indicated at 30 in Fig. 2.

A modified form of construction is shown in Figs. 3, 4 and 5, in which the segmental bearing plates 21 are circular, as indicated at 21a. If desired, they may be made of any other preferred shape of face without departing from the essential features of the invention.

In operation this thrust bearing is supplied with lubricant at its inner diameter portion, namely, the part closest to the main body of the shaft. As the contacting thrust collar on the shaft rotates each segmental bearing plate tilts slightly to a small degree, amounting normally to from one to several thousandths of an inch, thus increasing the normal separation between the bearing surfaces at the entrance point and decreasing the separation at the leaving point, considering any given location on the shaft thrust collar. Oil is drawn between the surfaces at the entrance location of each segment by suction and a wedge-shaped film of lubricant is established which carries a load of any degree up to the point where the thin portion of the film becomes so reduced in thickness that the film breaks down and the bearing is loaded beyond capacity. The angle of the wedge is controlled by the speed of rotation of the parts, by the loads imposed thereon and by the characteristics of the lubricant film. It is also affected by other incidental factors.

Hydraulic pressures of considerable value are created by this pump action and definite suction exists at the entrance locations so that as long as oil is supplied the constant renewal of the film between the bearing surfaces is completely automatic.

The pad or supporting material in the anchor pockets is displaceable, but practically incompressible and thus the confined thickness in each pocket is such that all segmental bearing plate surfaces are in the same plane when the bearing is assembled and at rest against a flat coacting plate. When in operation, however, each bearing plate surface tilts slightly as above indicated and this causes a slight relative displacement of the supporting material, resulting in somewhat less thickness of material at the entrance side of the wedge and a somewhat greater thickness at the exit side, while maintaining a complete support for the neck at all points.

Although no material is wholly incompressible the substances set out above as suitable for the supporting material and for all practical purposes accurately defined as "incompressible."

From the foregoing description it will be seen that I have provided a novel bearing of increased lubrication efficiency and which will handle great loads and occupy little space. Furthermore, by supplying an adequate amount of lubricant to keep the oil system full the replenishing of the films is completely automatic as is the automatic compensation for varying characteristics of speed and load in the same bearing at different times.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a thrust bearing structure, a thrust face, a series of bearing plates adapted to cooperate with said face to form a thrust bearing, a supporting member adapted to support said plates, and a solid thrust transmitting connection between said member and said plates to permit said plates to tilt about axes transversely of the axis of rotation while supporting the same at substantially all points thereof, said connection comprising portions of the bearing plates having annular convex surfaces, and resilient bearing pads interposed between said supporting member and said plate portions.

2. In a thrust bearing structure, a shaft member and a housing member adapted to receive said shaft, said members being rotatable relatively to each other, a thrust face formed on one of said members, a plate carried by the other of said members with a face opposed to and spaced from said first face, a series of spaced pockets formed in said second face and opening toward said first face, a segmentary bearing ring comprising a plurality of interdependent bearing plates mounted in said pockets to form a bearing surface with said first face, said plates having annular convex surfaces having a line contact with the side walls of said pockets in all positions of said plates, and incompressible, resilient, lubricant-resistant supporting pads in said pockets engaging said plates.

3. In a thrust bearing structure, a shaft member and a housing member adapted to receive said shaft, said members being rotatable relatively to each other, a thrust face formed on one of said members, an annular member carried by the other of said members having a series of circumferentially-spaced pockets formed therein and opening toward said thrust face, bearing plates mounted in said pockets and conjointly forming a bearing surface opposed to said thrust face, said plates having annular convex surfaces having a line contact with the side walls of said pockets in all positions of said plates, and resilient, lubricant-resistant supporting pads in said ring backing said plates.

LUCIEN I. YEOMANS.